Jan. 25, 1955 H. G. DE FRANCE 2,700,700

TELEVISION SYSTEM

Filed Feb. 16, 1949 3 Sheets-Sheet 1

INVENTOR
HENRI GEORGES DE FRANCE
BY
Bailey, Stephens & Huettig
ATTORNEYS

Jan. 25, 1955 H. G. DE FRANCE 2,700,700

TELEVISION SYSTEM

Filed Feb. 16, 1949 3 Sheets-Sheet 2

INVENTOR
HENRI GEORGES DE FRANCE
BY Bailey, Stephens & Huettig
ATTORNEYS

Jan. 25, 1955 H. G. DE FRANCE 2,700,700

TELEVISION SYSTEM

Filed Feb. 16, 1949 3 Sheets-Sheet 3

INVENTOR
HENRI GEORGES DE FRANCE
BY
Bailey, Stephens & Huettig
ATTORNEYS 2,700,700
Patented Jan. 25, 1955

2,700,700

TELEVISION SYSTEM

Henri Georges de France, Paris, France

Application February 16, 1949, Serial No. 76,806
Claims priority, application France September 14, 1948
4 Claims. (Cl. 178—7.7)

The present invention relates to devices for reproducing pictures and it is more especially concerned with television pictures.

Its chief object is to provide a device of this kind which is better adapted to meet with the requirements of practice than those existing at the present time.

According to my invention, in order to reproduce a picture of a scene, I mix together, either simultaneously or successively, sharp elementary images and elementary images of lower resolution, or sharp portions of elementary images and portions of lower resolution of these images, while varying constantly, according to a predetermined law, the distribution of the sharp and lower resolution portions, whereby each portion of the scene to be reproduced is periodically transmitted with maximum sharpness.

Preferred embodiments of the present invention will be hereinafter described with reference to the accompanying drawings, given merely by way of example and in which:

In Fig. 1, the rate of analysis is constant; in Fig. 2, it is varied in a sudden manner; in Figs. 3 and 4, it is varied gradually so as to obtain, according to the invention, variations in the fineness of analysis.

Figure 12:
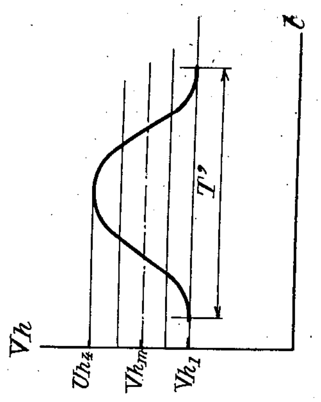
Figures 7, 8, 9, 10, 11:
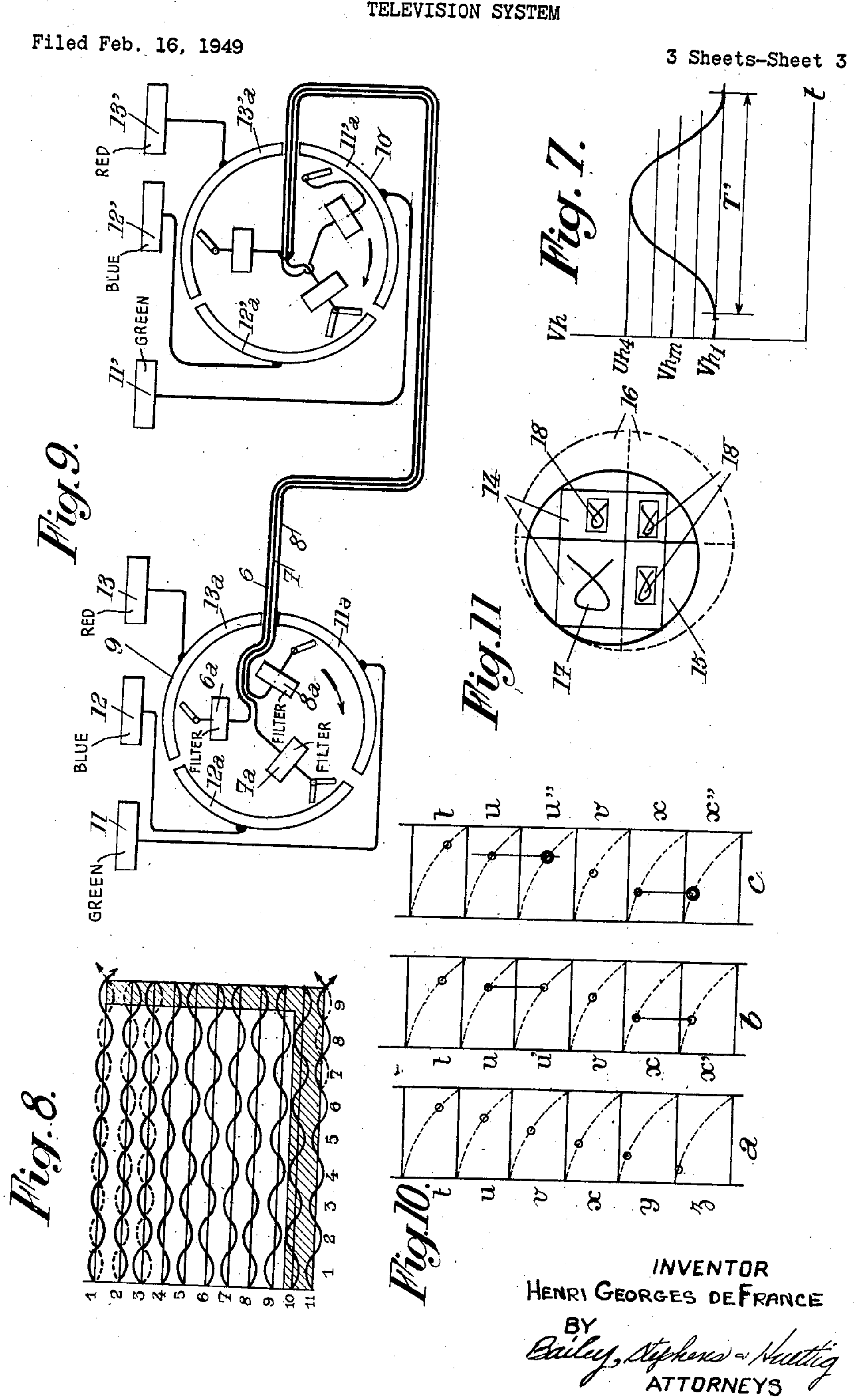
Fig. 7 is the curve of a variable horizontal analysis rate which permits of obtaining in television, according to my invention, an interlacing of more or less sharp points giving the feeling of sharpness.
Fig. 8 is a general diagram of the analysis rates of an image according to my invention.
Fig. 9 is a diagram illustrating how it is possible, according to my invention, to transmit color television through separate channels some of which may utilize limited bands.
Fig. 10 shows cinematographic frames intended to be projected at normal speed from records obtained at a rate which may be a sub-multiple of the normal rate, according to my invention.

Finally, Figs. 11 and 12 are relating to a color cinematographic process according to my invention, Fig. 11 shows a four-color disc rotating in front of the objective, and also the arrangement of the four corresponding monochromatic images on the cinematographic film; Fig. 12 shows an advantageous arrangement with three images to perform three-color projections.

It is known that moving pictures and television make use of the retinal persistence phenomenon to give the spectator the feeling of movement and continuity while using a succession of static pictures or portions of pictures.

It is also known that retinal persistence phenomena cause the eye to perceive, under certain conditions, the mean value of succesive impressions, even when these impressions differ between themselves. This fact is already used, in particular in certain color television methods, which consist in transmitting sharp pictures for one of the colored components, and lower resolution pictures, superposed thereto, for the other components.

However, in this case, one of the colors is favored at the constant detriment of the other colors, which may involve drawbacks.

I made experiments to establish to what degree the retinal persistence phenomenon permits of simultaneously or successively projecting sharp elementary pictures and lower resolution elementary pictures on a screen in such manner that the resultant picture remains sufficiently sharp, it being well understood that, according to the spirit of the invention, the use of so-called "lower resolution" elementary pictures does not imply a systematic reduction of the qualities of the resultant picture, and that the lower resolution effects are limited, for this purpose, concerning their number and their own characteristics.

These experiments showed in particular that, for black and white picture reproduction, when elementary pictures are projected at the rate of fifty per second, alternately a lower resolution one and a sharp one, it is possible to reduce the sharpness of the lower resolution pictures to a considerable degree without substantially modifying the appearance of the resultant picture. The same experiments further showed that at the rate of fifty per second, it is possible, in certain conditions, to have only every fourth picture sharp, while keeping a satisfactory sharpness of the resultant picture. Analogous results were also obtained concerning color pictures. Furthermore, it appeared possible and of high interest for practical purposes, to mix or juxtapose, in space, portions of sharp pictures and portions of lower resolution pictures, while still keeping a satisfactory sharpness of the resultant picture, if the positions of the sharp and lower resolution portions are made to vary constantly.

According to my invention, filmed or televised scenes are therefore reproduced by mixing, either simultaneously or successively, elementary sharp pictures and elementary lower resolution pictures, or sharp portions and lower resolution portions of elementary pictures, while constantly varying, according to a pre-established law, the distribution of the sharp portions or pictures and of the lower resolution portions or pictures, whereby each portion of the scene is periodically transmitted with maximum individual sharpness.

According to a first embodiment of my invention, I transmit in television a sequence of elementary pictures of variable sharpness, by performing the analysis of said pictures with a velocity which varies gradually and periodically both in the vertical and the horizontal direction. I can thus obtain a very important gain either in the spectrum of frequencies that is transmitted, if I maintain the fineness of the picture that would be analyzed at uniform velocity, or in the fineness, if I maintain the spectrum that would still correspond to constant velocity analysis.

It seems preferable, in this method, to keep at a constant value the number of lines of analysis, that is to say to keep at every time a fixed value of the ratio of the horizontal analysis rate to vertical analysis rate.

Figures 1, 2, 3, 4, 5, 6:
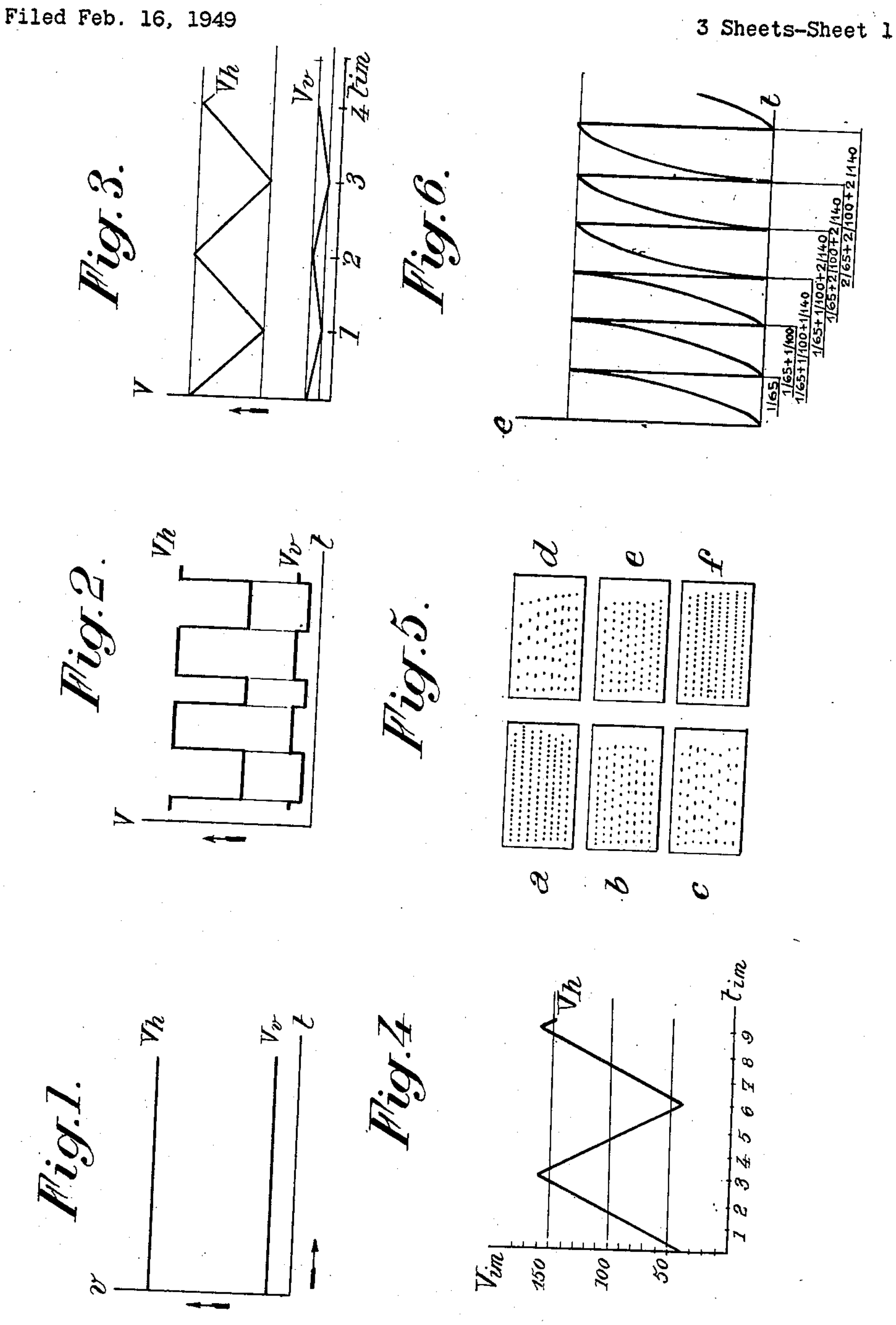
Figs. 1 to 4 are diagrams showing rates of analysis in television.
Fig. 5 shows point by point diagrammatic patterns obtained by performing analysis with a rate variation according to the law of Fig. 4.
Fig. 6 is a curve of the voltage in the vertical deflection coil of a tube in which analysis takes place at a rate varying according to the law of Fig. 4.

Figs. 1 to 4 are diagrams representing in different cases the horizontal analysis rate or speed $V_h$ and the vertical analysis rate or speed $V_v$ as a function of time $t$. The diagram of Fig. 1 is that of the usual analysis methods of the constant speed type; that of Fig. 2 corresponds to the case of two different analysis rates being used alternately, with practically instantaneous change from one to the other; that of Fig. 3 is a diagram traced in the case, which seems to be more advantageous, where the analysis speed is gradually varied. In this case, same as in that of Fig. 4, the scale of the abscissas is graduated in number of pictures.

Fig. 4 shows a particularly interesting case of this last device. The scale of the ordinates is graduated in numbers ($V_{im}$) measuring the number of vertical analyses that could be effected in a second by a spot moving at a uniform speed equal to the speed of the spot that is considered at the given time, and only the horizontal analysis speeds $V_h$ are shown, it being understood that the vertical analysis speeds are proportional thereto.

In the case that is being considered, the horizontal analysis speed is increased from 40 to 160 pictures per second during the analysis of the three first elementary pictures, then this speed is decreased from 160 to 40 during the analysis of the three next pictures. Therefore, the mean analysis speed is, in this case, 100 pictures per second.

The sharpness of the three first pictures thus transmitted decreases gradually as diagrammatically illustrated at *a*, *b* and *c* in Fig. 5; then the sharpness increases during the three next pictures, as shown at *d*, *e* and *f* on the same figure. On this figure, I have shown only eight of the analysis lines of each picture, and, in each line, the relative number of points that may be separated from one another, that is to say that give sharpness to the picture. It will be seen that, in this example, for every group of six pictures, the sharp pictures are the first and sixth ones. However the resultant picture has a sharpness very close to the sharpness of a picture that would be analyzed at a uniform rate of 50 pictures per second, which involves the consequences above mentioned concerning the important gain obtained in the characteristics of the transmission.

In order to perform such analyses at variable speed, it suffices to apply suitable voltages to the deflection coils. By way of example, I have shown in Fig. 6 the variations of the voltage *e* to be applied in the preceding case during six pictures to the vertical deflection coil, as a function of time *t*, which is plotted in fractions of seconds at a nonregular scale on the axis of abscissas.

According to another feature of my invention, I mix on a television receiver screen sharp elementary images, and lower resolution elementary images by proceeding, for transmission, to a horizontal analysis at a rate variable according to a certain periodicity, whereas the rate of vertical analysis is fixed, or at least not proportional to the horizontal analysis rate.

Thus I still produce a kind of interlacing of points at the receiver end. This interlacing has several advantages over the conventional analysis through interlaced lines. It it known that this last mentioned analysis involves, for certain movement of the televised subject, drawbacks due to stroboscopic effects and which may lead to disappearance of one half of the pattern.

Therefore let it be supposed that a uniform vertical analysis rate and a variable horizontal analysis rate $V_h$ are used, this last mentioned rate varying for instance in the ratio of 1 to 4, as shown by Fig. 7, $V_{hm}$ being the mean rate, $V_{h1}$ the minimum rate and $V_{h4}$ the maximum rate.

When the instantaneous rate of movement of the spot is higher than $V_{hm}$, the analyzed points are less distinct than in the case of a conventional analysis which would take place at uniform rate $V_h$ (in other words these points are more lower resolution); on the contrary, when the rate of movement of the spot is lower than $V_{hm}$, the corresponding points are sharper than in conventional analysis.

It then suffices, in order to have a sharp resultant picture, suitably to choose the horizontal and vertical analysis frequencies and the period T' of variation of the horizontal speed in such manner that, for a given zone of the image, sharp portions and lower resolution portions succeed one another on the screen.

Fig. 8 shows a satisfactory diagrammatic solution of this problem. The question is to analyse by successive lines an image of eleven lines numbered from 1 to 11 (including two lines which are not scanned and correspond, in the hatched zone, to retrace or fly-back of the spot at the end of the picture). It is necessary to choose an odd number of variations of the horizontal speed, so that the lower resolution portion of every line corresponds, in the vertical direction, to a sharp zone of each of the two adjoining lines, on either side of the line that is considered. A satisfactory result is obtained with nine variations per line (one of which, the last one, does not appear on analysis due to the retrace of the spot at the end of the line). Thus, in fact, on every complete analysis of a picture, a lower resolution portion succeeds, in the same zone, to a sharp portion of the preceding picture.

An analogous arrangement would apply to particular problems such as color television, point interlacing analysis of an order higher than the order 2 of the preceding example, etc.

According to still another feature of my invention, color television transmissions take place through separate channels, at least one of the channels transmitting a sharp image portion whereas the other channels transmit portions of images which are more or less lower resolution, the distribution of each of these channels to the various colors being constantly interchanged, whereby, upon reception, every elementary image of each color periodically presents the maximum sharpness.

Fig. 9 diagrammatically shows the devices which permit, at the transmitting and receiving ends, of ensuring the necessary switchings. It has been supposed, in this example, that a three-colour transmission takes place through three independent channels 6, 7 and 8. Filters *6a*, *7a*, *8a* are disposed at the transmitter at the end of these channels, one of the filters, *6a* for instance, letting pass the whole of the spectrum resulting from the analysis, whereas the two other filters and low-pass filters, allowing only a portion of the spectrum to pass. In other words, channel 6 transmits sharp images, whereas channels 7 and 8 transmit lower resolution images. Synchronized switches 9 and 10, one at the transmitting end and the other at the receiving end, shown in the form of mechanical switches, interchange the colors admitted at any time into each of the three channels. For this purpose, at the transmitting end, the green color 11 is connected in fixed manner with the sector 11*a* of the switch, the blue color 12 is connected with sector 12*a*, and the red color 13 is connected with sector 13*a*; the same arrangement exists at the receiving end, where the same elements are indicated by the same numerals with index '.

I will now indicate other features of my invention as applied to moving pictures.

According to a feature of my invention, lower resolution images are periodically interposed in a cinematographic film made for a certain rate of projection and which is to be used at a different rate while maintaining the same appearance of the projected moving pictures.

One of the cases which occur frequently is the transposition of films of the sixteen frames per second type into films of the twenty four frames per second type; this is the case which will be dealt with by way of example.

Fig. 10 shows, in three different cases, six frames of a motion picture film intended to be projected at the rate of twenty four frames per second.

Fig. 10*a* shows the ordinary case of a film exposed at this rate; the six frames are therefore composed of six distinct images *tuvxyz* (it being supposed that a moving object is shown).

Fig. 10*b* shows the usual method for performing the transposition of a sixteen frames per second film into a twenty four frames per second film: every second image is identically reproduced on the film; whence the sequence of images *t*, *u*, *u'*, (repetition of *u*) *vxx'* (repetition of *x*).

This method is satisfactory when the movements that are recorded are slow or non existent, but not when these movements are quick, because in this case these movements seem to be jerky.

According to the present embodiment of the invention, instead of identically repeating every second image of the sixteen frames per second film, the image that is repeated is lower resolution, as shown at *u''* and *z''* in Fig. 10*c*. The film made in these conditions gives the feeling of continuity of movements, which was lacking in the film made as on Fig. 10*b*, and this without involving any substantial loss of sharpness.

According to still another feature of my invention, color motion picture projections are effected from monochromatic images juxtaposed on every frame of a film, while giving to one of these images, which is constantly changed, a sharpness higher than that of the other monochromatic images.

Among the known colored moving pictures projection processes, there is one according to which several monochromatic pictures are juxtaposed on each frame of a black and white film, each of these pictures being projected separately through a colored filter and the merging of the monochromatic colored pictures being carried out on the screen. This method has in particular the disadvantage of reducing the sharpness of the images on the screen, due to the important reduction of dimensions imposed on the film to each monochromatic picture and it also suffers from drawbacks due in the first place to the difficulty of optically superposing four sharp pictures in a satisfactory manner and in the second place to the impossibility of making allowance at any time for variations of the film rate of unwinding.

The invention obviates this drawback by giving, on each frame of the film, to one of the monochromatic pictures, dimensions much larger than those of the other monochromatic pictures, and by periodically interchanging, for instance upon passage of every frame, the color corresponding to the monochromatic image of largest size. Thus, provided of course that projection is carried out with a suitable device, it is possible finally to obtain on the screen a colored picture which is substantially sharper than with the known process.

Fig. 11 diagrammatically shows by way of example, the frame 14 of a film in the case of a four-color decomposition process, the objective 15 of the moving picture apparatus (camera or projector) and a translucent disc 16 with four colored sectors, rotating in front of or behind objective 15, at a speed which is a function of the rate of unwinding of the film, and for instance at a rate equal in revolutions per second to one fourth of the rate of unwinding of said film, as reckoned in number of frames per second.

On recording, the large size image 17 will be successively the picture of each of the four colors and it will suffice to project the film thus obtained, by means, in particular, of a disc analogous to disc 15, rotating with suitable phase relation and frequency, to recompose the scene filmed in color.

In the preceding example, it was supposed that the pictures 18 of smaller dimensions were given dimensions equal between themselves. According to a modification, I might of course give them unequal dimensions, and even areas not similar to one another. Fig. 12 shows, by way of example, an advantageous arrangement of the three monochromatic images in the case of a three color process. Of course, suitable objectives restore, for projection, the equality of size of the projected images.

According to still another feature of my invention, sharp and lower resolution images are mixed to obtain a moving picture projection without interruption.

It is known that the usual methods of moving picture projection project a fixed frame during a portion of a second, after which the objective is hidden, whereas the filmed is moved forward for the next frame.

Up to the present time in order to effect projection without occultation, the film was generally moved in a continuous manner and this displacement was optically compensated for, for instance by means of an oscillating mirror to keep the frame of each projected picture fixed on the screen. However, the results obtained with this process were not satisfactory, due to mechanical construction difficulties.

The mixing of sharp and lower resolution pictures according to my invention permits of giving this problem a satisfactory solution. This solution consists in projecting onto the moving picture screen first the fixed and sharp image of a stationary frame, as usual, and this for most of the considered period, and then a picture which is caused, through optical means, to remain stationary on the screen, while the frame that is considered is displaced to bring the next frame opposite the objective. This second picture may be lower resolution either systematically or accidentally, without the resultant image on the screen loosing its sharpness. However, I thus obtain a projection which is substantially more luminous and stable than with the present method.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. The method of television scanning which comprises repeatedly moving a scanning beam across the image to be transmitted along a series of parallel lines covering the area of said image, the velocity of movement of said beam along said lines being the line scanning rate and the velocity of displacement of said beam from one line to the next one being the frame scanning rate, periodically varying both of said scanning rates simultaneously while maintaining a constant factor of proportionality between them, and maintaining the period of said scanning rate variation and any integral multiple thereof different from the time taken by the beam to return to the same point of the image during one scanning thereof.

2. The method of television scanning which comprises repeatedly moving a scanning beam across the image to be transmitted along a series of parallel lines covering the area of said image, the velocity of movement of said beam along said lines being the line scanning rate and the velocity of displacement of said beam from one line to the next one being the frame scanning rate, and periodically varying both of said scanning rates simultaneously while maintaining a constant factor of proportionality between them, and maintaining the period of said scanning rate variation equal to an integral multiple of the time taken by the beam to return to the same point of the image during one scanning thereof.

3. The method of television scanning which comprises repeatedly moving a scanning beam across the image to be transmitted along a series of parallel lines covering the area of said image, the velocity of movement of said beam along said lines being the line scanning rate and the velocity of displacement of said beam from one line to the next one being the frame scanning rate, periodically varying both of said scanning rates simultaneously while maintaining a constant factor of proportionality between them, maintaining the period of said scanning rate variation equal to an integral multiple of the time taken by the beam to return to the same point of the image during one scanning thereof, and maintaining the rate of scanning constant during every scanning of the image and changing the rate of scanning from one image scanning to the next one.

4. The method of television scanning which comprises moving a scanning beam along the image to be transmitted with a rate of scanning which varies, both horizontally and vertically, cyclically according to a predetermined law which is a function only of time with a periodicity which is different from and whose integral multiples are different from the periods corresponding to the scanning of one line and one frame in such a way that, at every point of said image, the rate of scanning varies recurrently, the variations of scanning rates being made such that the ratio of the rates of horizontal and vertical scannings remains constant, and maintaining the rate of scanning constant during the scanning of one frame and varying such rate from one frame to the next one.

References Cited in the file of this patent

UNITED STATES PATENTS

| | | |
|---|---|---|
| 1,289,940 | Shaw | Dec. 13, 1918 |
| 1,794,103 | Cubitt | Feb. 24, 1931 |
| 2,037,577 | Harries | Apr. 14, 1936 |
| 2,138,577 | Bray | Nov. 29, 1938 |
| 2,143,933 | Barthelemy | Jan. 17, 1939 |
| 2,251,525 | Rosenthal | Aug. 5, 1941 |
| 2,277,192 | Wilson | Mar. 24, 1942 |
| 2,335,180 | Goldsmith | Nov. 23, 1943 |
| 2,353,876 | Cawein | July 18, 1944 |
| 2,446,635 | Cooley | Aug. 10, 1948 |
| 2,478,384 | Fritts | Aug. 9, 1949 |

FOREIGN PATENTS

| | | |
|---|---|---|
| 909,949 | France | May 22, 1946 |